(12) United States Patent
Ondo et al.

(10) Patent No.: US 12,165,783 B2
(45) Date of Patent: Dec. 10, 2024

(54) MODULAR CABLE HOLDING SYSTEM AND DEVICE

(71) Applicant: TE Connectivity Services GmbH, Schaffhausen (CH)

(72) Inventors: Mark Andrew Ondo, Middletown, PA (US); Craig Roper, Middletown, PA (US); Isaac Cruz, Middletown, PA (US); Todd Matthew Troutman, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 622 days.

(21) Appl. No.: 17/395,989

(22) Filed: Aug. 6, 2021

(65) Prior Publication Data
US 2023/0041384 A1 Feb. 9, 2023

(51) Int. Cl.
*H01B 13/00* (2006.01)
*B23Q 3/06* (2006.01)

(52) U.S. Cl.
CPC ......... *H01B 13/0036* (2013.01); *B23Q 3/064* (2013.01); *H01B 13/0003* (2013.01); *B23Q 2703/10* (2013.01)

(58) Field of Classification Search
CPC ........ B23Q 3/064; B23Q 3/066; B23Q 3/067; B23Q 3/02; B23Q 3/06; B23Q 3/062; B23Q 3/102; B23Q 3/103; H01B 13/0003; H01R 43/0263; H01R 43/048; H01R 43/052
See application file for complete search history.

(56) References Cited

U.S. PATENT DOCUMENTS

| 5,132,493 | A | 7/1992 | Sheehan | |
|---|---|---|---|---|
| 2013/0264319 | A1* | 10/2013 | Temby | B23K 9/0953 219/130.1 |
| 2019/0193320 | A1* | 6/2019 | Lang | H01B 13/24 |

FOREIGN PATENT DOCUMENTS

DE 202007014210 U1 * 1/2008 ........... H02G 1/1217

OTHER PUBLICATIONS

International Search Report, International App. No. PCT/IB2022/05730 International Filing Date Aug. 5, 2022.

* cited by examiner

*Primary Examiner* — Tyrone V Hall, Jr.

(57) ABSTRACT

A cable holding system for positioning a cable relative to a cable processing machine comprises a cable holding device for selectively clamping onto a cable to be processed, and a receiver. The receiver includes an opening for selectively receiving the cable holding device in a predetermined orientation, and a mounting base for fixing the location of the receiver relative to the cable processing machine.

20 Claims, 12 Drawing Sheets

MODULAR CABLE HOLDING SYSTEM AND DEVICE

FIELD OF THE INVENTION

The present disclosure relates to electrical cable processing, and more particularly, to a cable holding device and an associated cable holding system useful in cable processing applications.

BACKGROUND

The rapid advancement of electronics and electrical equipment has been accompanied by similar advancements in connectivity technologies, including cables and cable termination products, and associated manufacturing techniques. The complexity of these products has created challenges from a manufacturing perspective. In particular, regarding the placement of a cable (and/or its partially terminated end) relative to a cable processing machine, tightened positional tolerances and requirements are increasingly difficult to achieve with existing semi-automated and/or manual cable processing techniques. While fully-automated cable processing systems may be capable of meeting these heightened performance standards, such systems are costly and time-consuming to implement, and therefore may not be of sufficient value, particularly for low-volume applications. As a result, semi-automated and manual cable processing systems and methods are still of significant value to the industry, provided they can be implemented with a suitable degree of precision and efficiency, particularly regarding the positioning of a cable relative to a given machine.

Accordingly, there remains a need for improved manual cable handling systems and associated devices which improve manufacturing accuracy, repeatability, efficiency as well as operator safety.

SUMMARY

A cable holding system for positioning a cable relative to a cable processing machine according to an embodiment of the present disclosure comprises a cable holding device for selectively clamping onto a cable to be processed, and a receiver. The receiver includes an opening for selectively receiving the cable holding device in a predetermined orientation and a mounting base for fixing the location of the receiver relative to the cable processing machine.

A cable holding device for securing a cable relative to a cable processing machine according to an embodiment of the present disclosure comprises a body, a clamp movably mounted to the body, and an opening defined between the body and the clamp for receiving the cable. In a clamped position relative to the body, the clamp secures the cable within the opening. A locating feature is provided on the body for fixing a position of the cable relative to the cable processing machine with the cable secured within the opening.

A receiver for positioning a cable holding device relative to a cable processing machine according to an embodiment of the present disclosure comprises a base, a receiving body mounted to the base and defining an aperture for receiving the cable holding device, and a locating feature for positioning the cable holding device relative to the receiving body.

BRIEF DESCRIPTION OF THE DRAWINGS

The invention will now be described by way of example with reference to the accompanying Figures, of which.

DETAILED DESCRIPTION OF THE EMBODIMENTS

Figure 1:
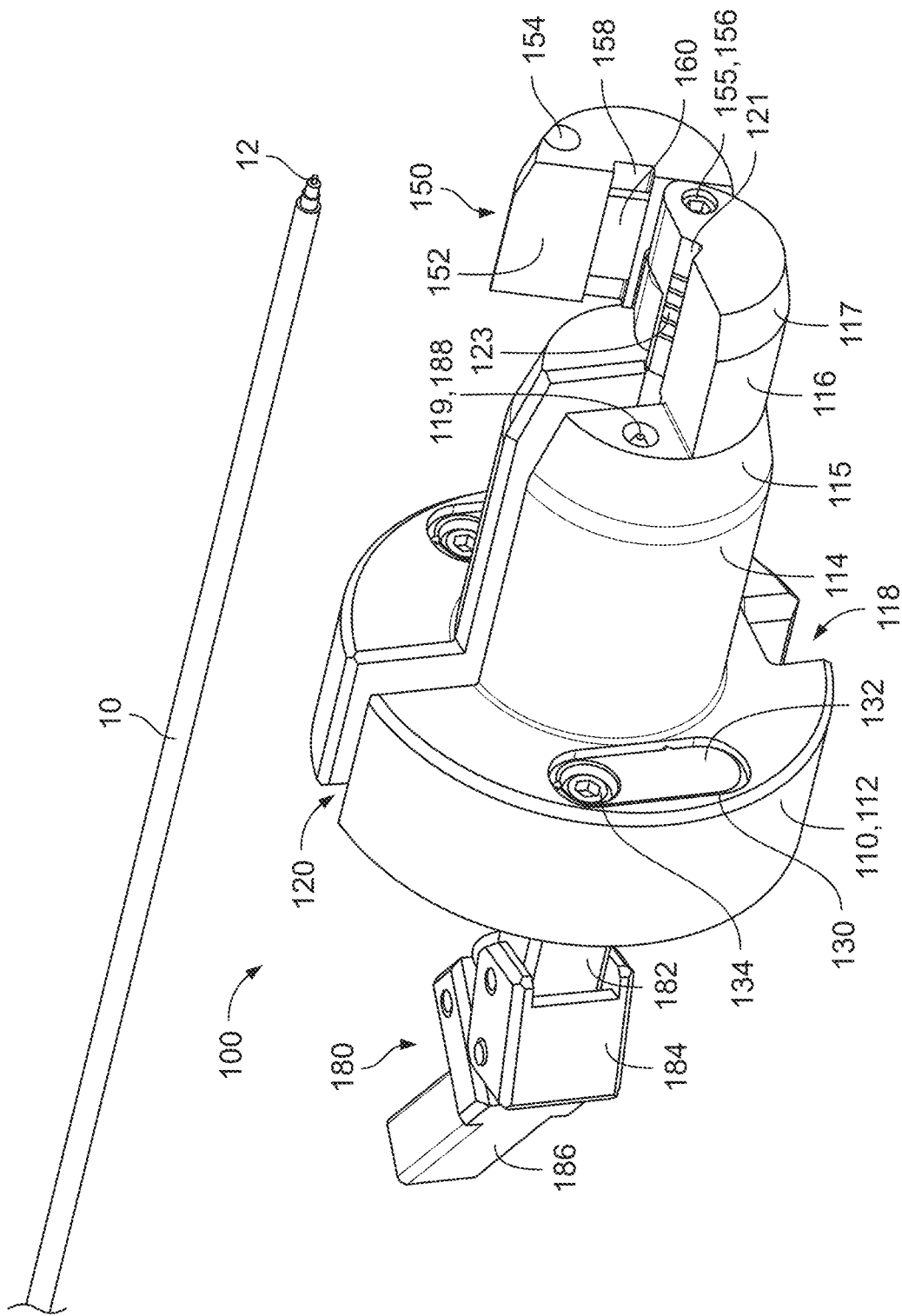
FIG. 1 is a front perspective view of a cable holding device according to an embodiment of the present disclosure in an open position prior to cable insertion.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure are directed to a modular cable handling or holding system for a manual or semi-automated cable processing or assembly line. The system includes a cable holding device for fixing to a cable to be processed, and one or more receivers located at one or more corresponding cable processing machines or stations for receiving and positioning the cable holding device in a precise manner. In this way, after initially fixing a cable within the cable holding device, the position of the cable relative to each cable processing machine in the cable processing line can be kept consistent by the utilization of a common receiver. The system provides a high degree of positional accuracy, similar to that of fully-automated cable processing systems, but at a significantly lower investment cost.

Figure 5:
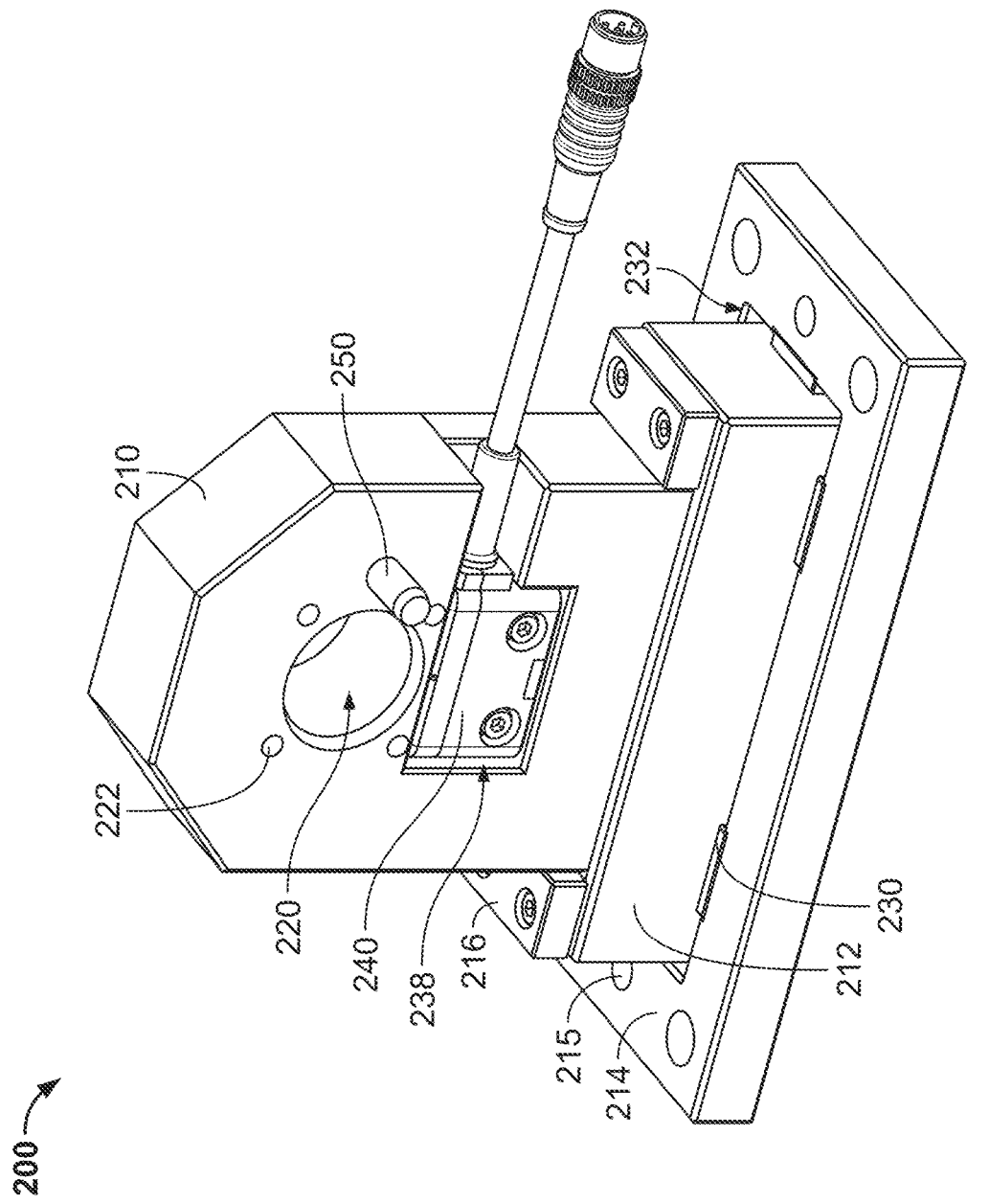
FIG. 5 is a front perspective view of a receiver for use with the cable holding device of the preceding figures according to an embodiment of the present disclosure.

Referring generally to FIGS. 1 and 5, a modular cable holding system according to an embodiment of the present disclosure includes a cable holding device 100 for selectively fixing or clamping onto a cable 10 to be processed (see FIG. 1), and one or more cable holding device receivers 200 (see FIG. 5). The receiver 200 accepts and retains the cable holding device 100 in a precise position relative thereto, and thus accurately and consistently positions a working end 12 of the cable 10 in both axial and radial directions relative to an associated cable processing machine. As will be set forth in greater detail herein, a plurality of receivers 200 may be arranged at or fixed relative to various cable processing machines or stations, each performing one of a plurality of steps necessary to properly prepare the cable 10 for a given application (e.g., strip, ferrule crimp, connector crimp, etc.). In this way, once fitted with the cable holding device 100, the cable 10 may be moved through each processing machine or station by inserting the cable holding device 100 into a receiver 200 arranged at each station. As the receiver 200 and holding device 100 ensure accurate and consistent cable placement, processing accuracy and efficiency is improved at each step, particularly as a user does not have to take the time to accurately manually locate the cable at each station. In addition to improved cable processing performance, the holding device 100 and the receiver 200 include added features for improving operator safety, as will be set forth in detail herein.

Figure 2:
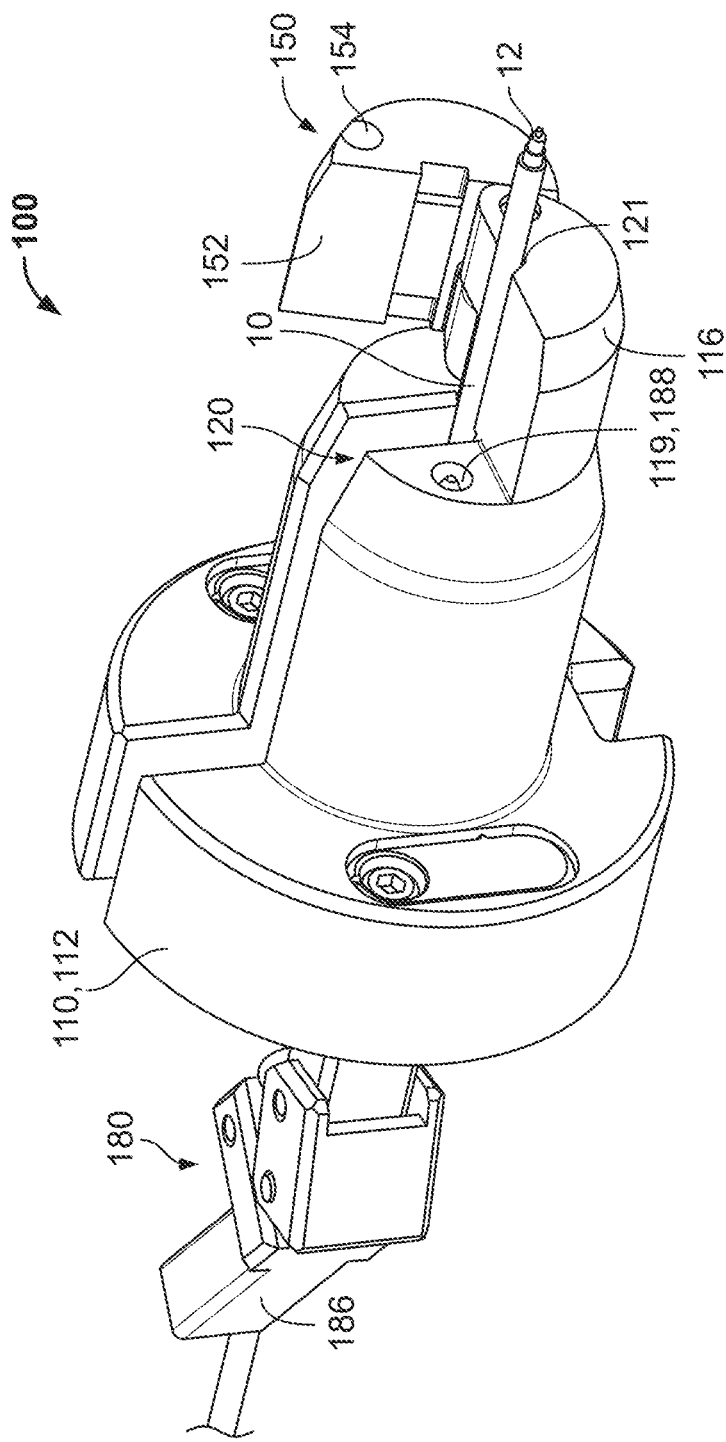
FIG. 2 is a front perspective view of the cable holding device of FIG. 1 with a cable inserted therein.
Figure 3:
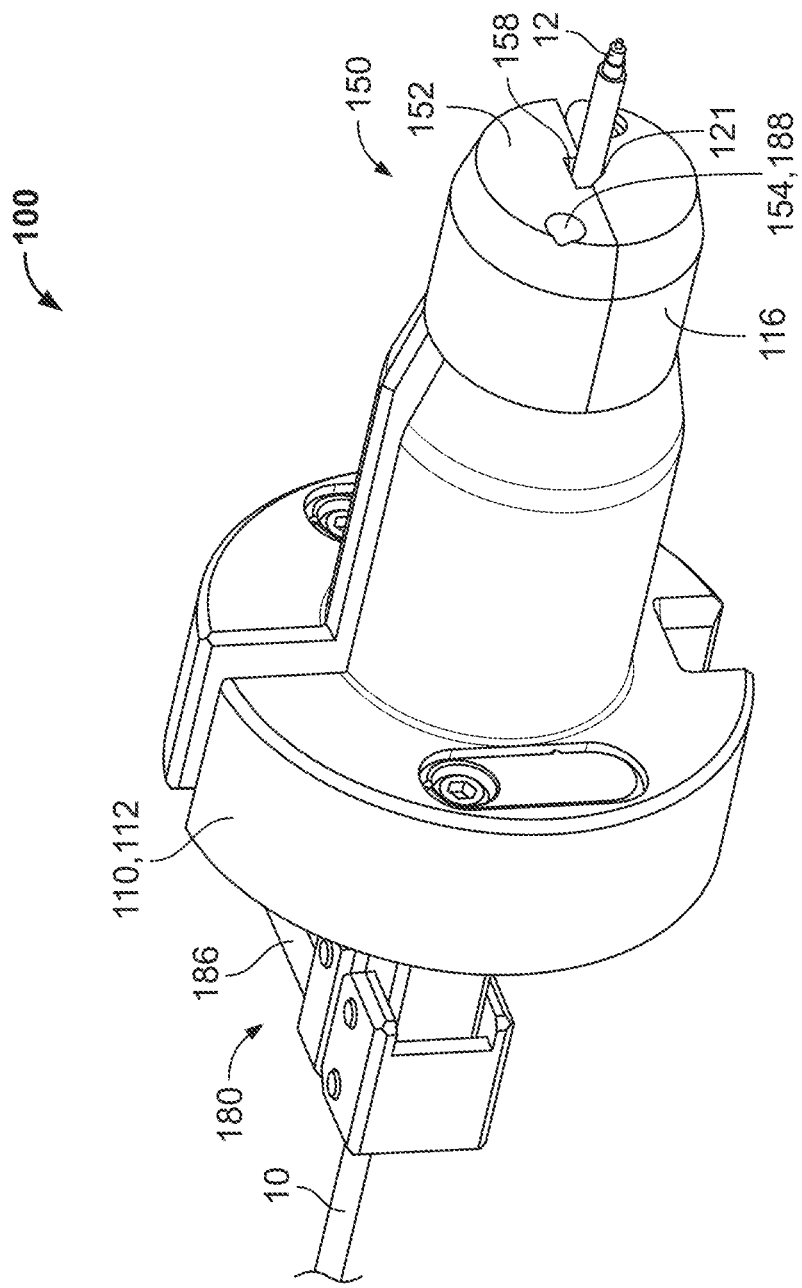
FIG. 3 is a front perspective view of the cable holding device of FIGS. 1 and 2 in a closed or clamped position.

With particular reference now to FIGS. 1-4, the cable holding device 100 includes a main body 110 including a flange-like base 112 at a rear of the device, an intermediate portion or section 114 extending from the base, and a front end portion or section 116 extending from the intermediate section. In the exemplary embodiment, the base 112 and the intermediate section 114 of the body 110 are cylindrical in shape, and the end section 116 is semi-cylindrical in shape (or cylindrical in shape with a clamping end 152 thereof in a closed or clamped position, as shown in FIG. 3). However, it should be understood that the body and an associated receiver opening may define other shapes without departing from the scope of the present disclosure.

The intermediate and end sections 114,116 of the body 110 are sized to be inserted into the receiver 200. More specifically, the intermediate section 114 is sized to provide a sliding, precision fit with an opening 220 of the receiver 200 (see FIG. 5). In order to improve the ease at which the device 100 is insertable into the receiver 200, the end section 116 of the body 110 defines a primary cross-sectional dimension (e.g., diameter) that is less than a primary cross-sectional dimension (e.g., diameter) of the intermediate section 114. In this way, the shape of the body 110 provides two-stage locating functionality, with the engagement of the end section 116 into the receiver 200 defining an initial or coarse locating function, and the final engagement of the intermediate section 114 defining a subsequent fine locating function. The ease with which the device 100 is engaged with the receiver 200 may be further improved by the addition of chamfers or inclined surfaces 115,117 on a front end face of the end section 116, as well as between the end section 116 and the intermediate section 114, respectively, for creating a stepped and tapering overall outer profile.

Still referring to FIG. 1, the body 110 further defines a cable slot or opening 120 formed therein for receiving the cable 10. In the exemplary embodiment, the opening 120 is formed into the base 112, the intermediate section 114 and the end section 116 in a radially-inward direction. The opening 120 extends past an axial center of the body 100 to create a floor or bottom surface 121 against which the cable 10 rests. The floor 121 may be semi-circular or V-shaped in profile, by way of example. A plurality of serrations 123 may be formed on the floor 121, particularly in the area of the end section 116, for gripping an outer sheath or jacket of the cable 10 proximate the working end 12.

FIG. 2 illustrates the device 100 with the cable 10 installed therein in an open or unclamped state. As shown, the cable 10 is arranged within the slot 120 and against the floor 121, and extends along (i.e., is coaxial with) the axial center of the body 110. With the cable 10 arranged within in the opening 120, the working end 12 extends in an exposed manner from the end section 116 for performing cable processing operations thereon. As should be understood, the depth of the floor 121 relative to the axial center of the body 110, as well as the width of the opening 120, may be dependent upon the diameter of the cable 10 to be processed. In this way, in practice, a module cable processing system includes various cable holding devices having unique opening sizes and depths for processing cables of differing sizes or diameters.

Referring again to FIG. 1, the end section 116 defines a hinged or rotating clamp assembly 150 for selectively clamping onto the cable 10. Specifically, a pivoting clamp or clamping end 152 is rotatably attached to the end section 116 via a pin or shouldered fastener 155 inserted through an aperture 156 formed in the clamping end 152, and a corresponding coaxial aperture formed in the end section. The fastener 155, and the pivoting axis defined thereby, are arranged parallel to the axial center of the body 110 and/or the cable 10 arranged therein.

A slot 158 is formed through the clamping end 152 in the axial direction and corresponds in location to the axial center of the body 110 with the clamping end in the closed or clamped position. As shown in FIG. 3, the floor 121 of the opening 120 and the slot 158 may define, for example, a generally triangular cross-section at least in the end section 116 with the clamping end 152 in the closed position. An elastomeric or otherwise compliant material in the form of an elastically compressible member 160 is arranged within the slot 158 for gripping the cable 10 in the closed position without damage thereto. The elastically compressible member 160 also ensures that a more consistent force acts on the cable 10, and thus against the floor 121 and/or the serrations 123.

The cable holding device 100 further comprises a clamp lock or locking assembly 180 for selectively fixing the clamping end 152 in the closed position relative to a remainder of the end section 116. The locking assembly 180 includes a sliding locking pin 188 for engaging with a corresponding locking aperture 154 formed at least partially through the clamping end 152. The locking pin 188 is arranged within a locking pin aperture or through hole 119 formed through the body 110, and in particular the base 112 and the intermediate section 114, and extends generally parallel to the central axis of the body. With the clamping end 152 in the closed position shown in FIGS. 3 and 4, the apertures 119,154 are coaxially aligned, and a first end of the locking pin 188 may be inserted through the aperture of the clamping end, locking it in the illustrated position.

Figure 4:
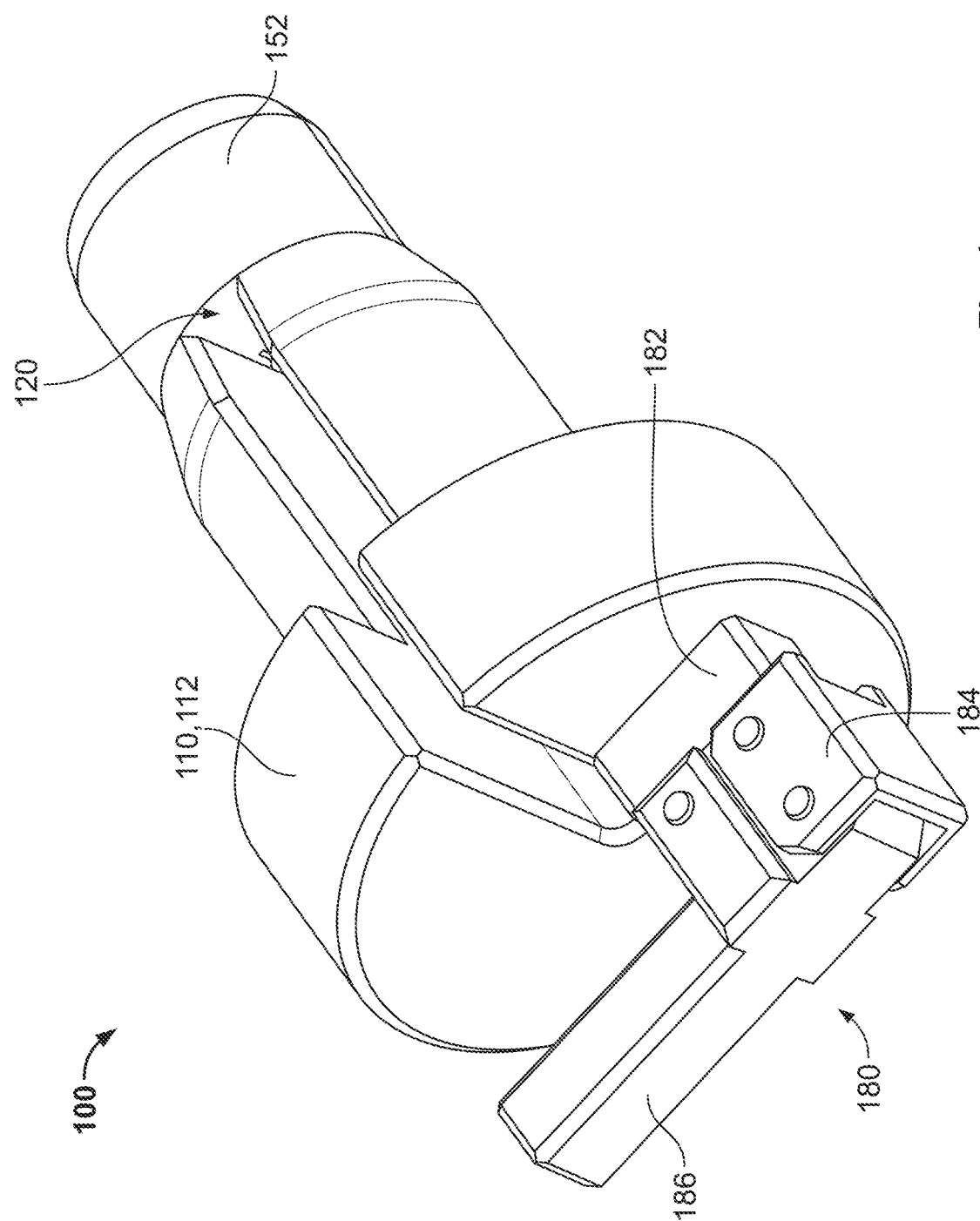
FIG. 4 is a rear perspective view of the cable holding device of FIGS. 1-3 in the closed or clamped position.

A second end of the locking pin 188 is connected to a moveable lever arm 186 of the locking assembly 180 for selectively axially translating the pin 188 within the aperture 119. More specifically, the locking assembly 180 includes a mounting block 182 fixedly attached to a rear side of the base 112, and an intermediate pivoting block 184 hingedly connected between the mounting block 182 and the lever arm 186. Pivoting the lever arm 186 relative to the intermediate pivoting block 184 and the mounting block 112 is operative to bias the pin 188 in either axial direction within the aperture 119 for selectively locking and unlocking the clamping end 152. Specifically, with the lever arm 186 in the open position shown in FIGS. 1 and 2, the locking pin 188 is in a retracted state within the body 110, and the clamping end 152 is free to be rotated into and out of the closed position. Referring generally to FIGS. 3 and 4, with the lever arm 186 biased or rotated toward the base 112 and into a closed position, the locking pin 188 is driven toward the front of the device 100, and extends into the locking aperture 154 for fixing the clamping end 152 in place.

Referring again to FIG. 1, the clamping device 100 includes a locating feature in the form of a keyway or slot 118 defined through the base 112 in the axial direction. The keyway 118 is sized and positioned to receive a corresponding key or locating pin 250 of the receiver 200, as shown in FIG. 5. The keyway 118 and the locating pin 250 provide a means to accurately position the device 100 in the radial direction (and thus the cable) relative to the receiver 200 and to an associated cable processing machine.

The device 100 further includes one or more cavities 130 (e.g., two in the exemplary embodiment) defined in a forward-facing side of the base 112 for receiving radio frequency identification (RFID) tags. In one embodiment, the illustrated elements 132 define covers securing the RFID tags within the cavities via fasteners 134. In other embodiments, the illustrated elements 132 define the RFID tags, which are secured to the base 112 via the fasteners 134. In either embodiment, the RFID tags may be used as a part of a safety interlock system with the receiver 200 for preventing the unintended or undesired operation of an associated cable processing machine, and/or may be used to identify, for example, a type of cable (e.g., size, configuration, etc.) secured within the device 100. The type of cable identified by the RFID tag 132 and receiver 200 may be utilized by the associated cable processing machine for dictating at least one of its operating characteristics.

Figure 6:
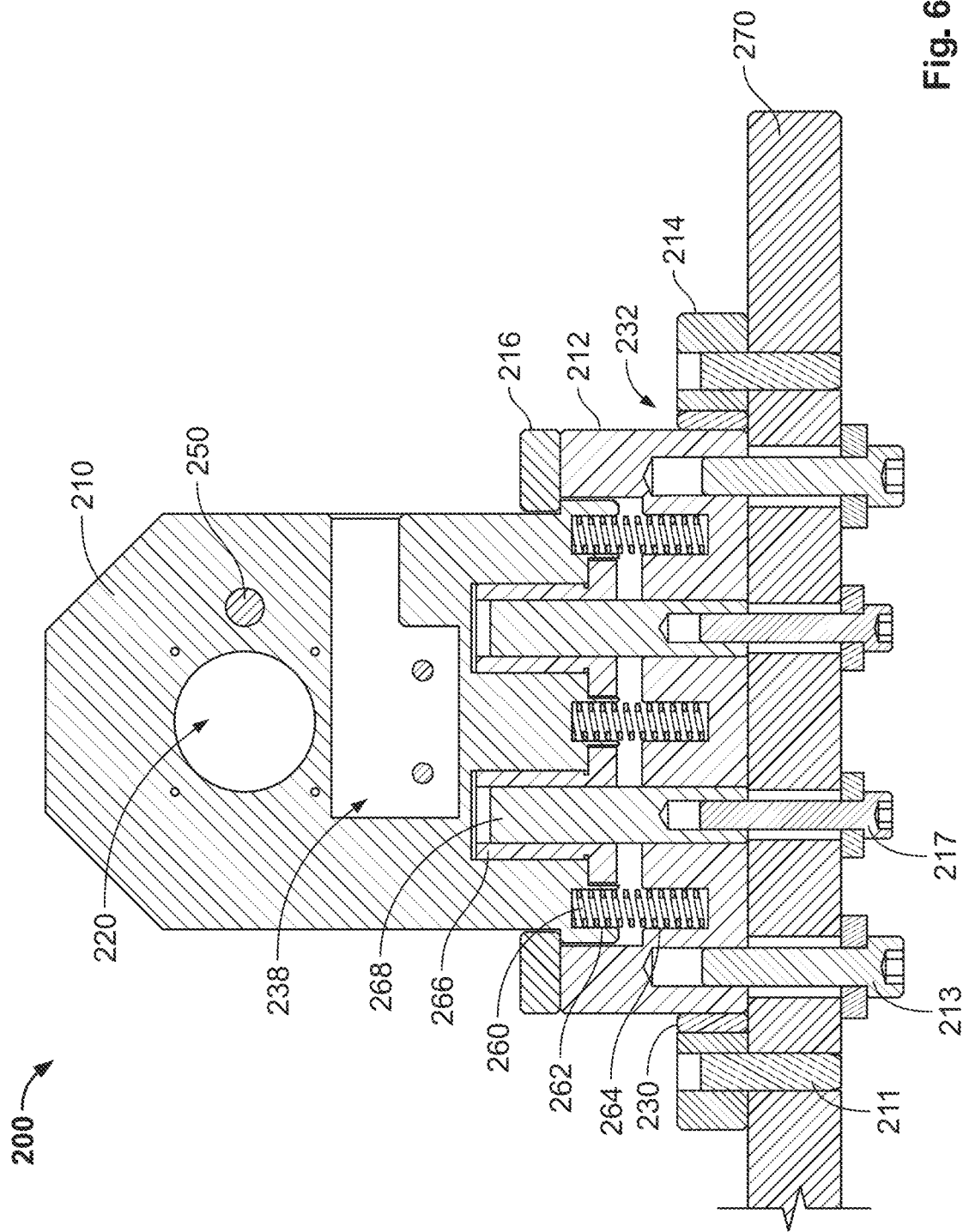
FIG. 6 is a front cross-sectional view of the receiver of FIG. 5.
Figure 7:
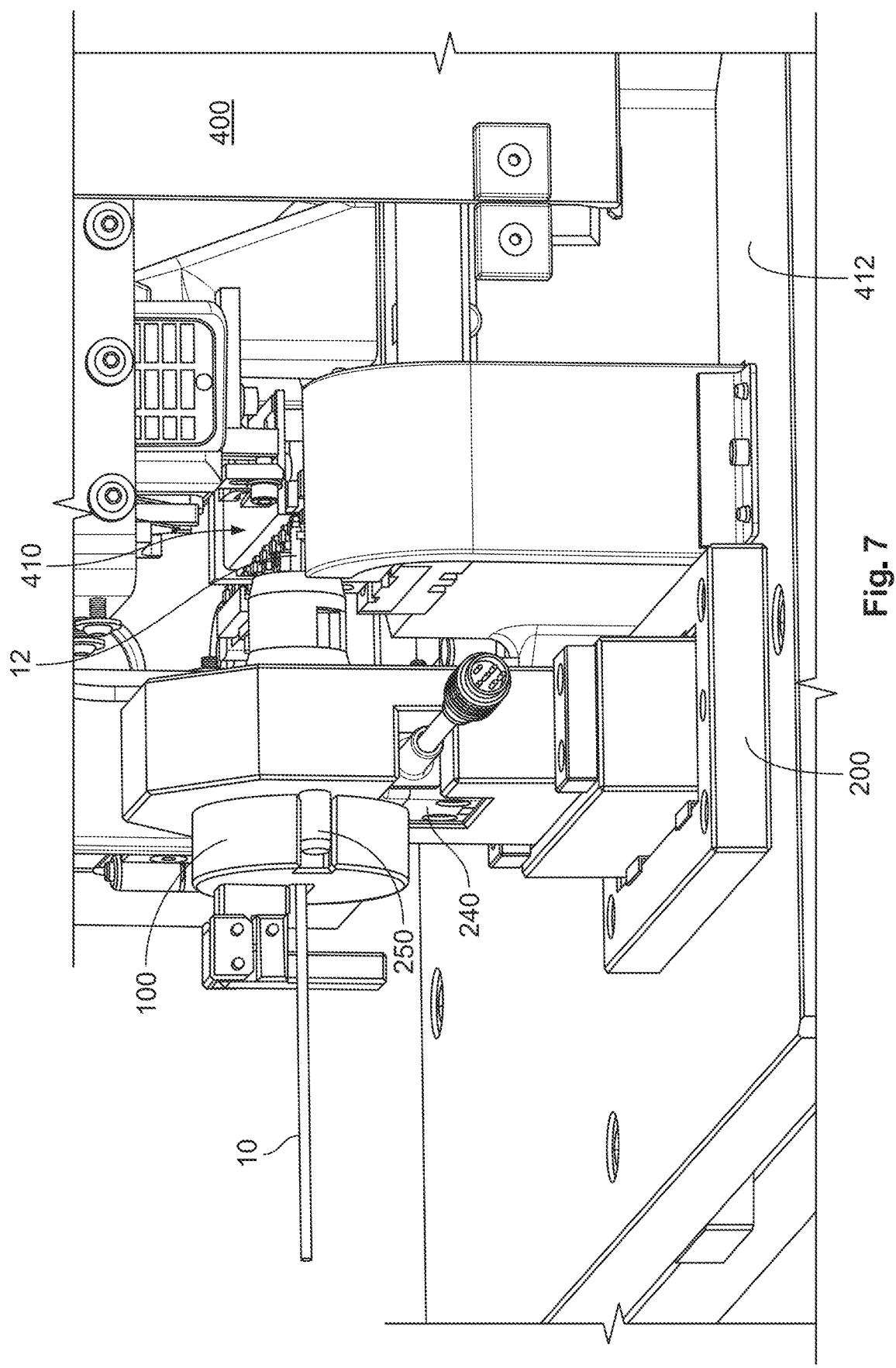
FIG. 7 is a side perspective view of the cable holding device and receiver of the preceding figures in use with an exemplary cable processing machine.

Referring again now to FIG. 5, as well as to FIG. 6, the receiver 200 includes a main body 210 defining the bore or opening 220 sized to receive the device 100 therein. A plurality of magnets 222 are embedded in the main body 210 and arranged radially about the opening 220. The magnets 222 are operative to hold the base 112 of the device 100 in position within the opening 220, preventing any axial movement once the device 100 is installed into the receiver 200. Thus, at least the base 112 of the device 100 may be manufactured from a ferrous material subject to a magnetic attraction force of the magnets 222. As set forth above, the key or locating pin 250 is fixed to or defined by the main body 210 and is configured to engage with the keyway 118 of the device 100 for radially aligning the device within the opening 220, as shown in FIG. 7.

The main body 210 further defines a cavity 238 formed under the opening 220 and holding an RFID interlock device or switch 240 for disabling at least one operational aspect of a cable processing machine associated with the receiver 200. More specifically, the RFID interlock switch 240 is operatively connected to a given cable processing machine or station, and is adapted to interrogate or read the RFID tags 132 embedded in the device 100 only when the device is in a properly installed position within the receiver 200. When an approved device 100 (or tag 132) is recognized, the interlock switch 240 enables at least one operative function of the machine. Absent the presence of an approved RFID tag 132, however, the machine remains disabled by the interlock switch 240, preventing unwanted and potentially unsafe operation thereof.

The receiver 200 further includes a base 214 which may define apertures 215 therethrough for positioning the base relative to a cable preparation machine. For example, locating pins 211 may be fitted between a table 270 supporting the machine and the base 214 for accurately positioning the base relative to the machine. An intermediate mounting block or base 212 is arranged within an opening 232 of the base 214 and is secured to the table 270 via fasteners 213. Spacing elements 230 may be provided between the base 214 and the mounting block 212 for precisely positioning the mounting block (and main body 210) relative to the base.

As shown in FIG. 6, in one embodiment, the main body 210 is movably mounted to the mounting block 212, and more specifically, mounted to permit at least some relative vertical movement therebetween. This may be achieved via one or more elastic elements, such as springs 260, arranged between the mounting block 212 and the main body 210. In the exemplary embodiment, each of the springs 260 has its free ends positioned within corresponding apertures 262,264 formed in the main body 210 and the mounting block 212, respectively. The springs 260 are adapted to bias the main body 210 into the elevated or initial position shown in FIG. 6, and to permit motion of the main body in each vertical direction. In other embodiments, one or more actuators may be provided for actively altering the vertical position of the mounting block 212 relative to the base 214. In this way, the vertical position of the main body 210 (and the device 100) may be coordinated with the movement of the cable processing machine or station in any desired manner. For example, vertical compliance or motion is useful for enabling a cable to be initially positioned above a terminal, and lowered or pressed into a crimping barrel thereof during a crimping operation. This may be achieved by, for example, a device on a crimping press which biases the main body 210 downward during a crimping process. Once complete, the cable and terminal return upwardly under the return force of the springs and into the initial position, permitting a new terminal to be fed thereunder.

The main body 210 may further include guide bushings 266 installed therein for receiving corresponding guide rods 268 in a sliding manner. The guide rods 268 may be fixedly attached to the mounting block 212 and/or the table 270 by fasteners 217. The guide bushings 266 and guide rods 268 ensure precise movement of the main body 210 relative to the mounting block 212 as the main body is translated in the vertical directions. Positioning blocks or retainers 216 may be arranged on either side of the main body 210 and secured to the mounting block 212 for further ensuring that proper alignment of the main body is maintained.

Referring now to FIG. 7, the receiver 200 is shown in an exemplary working installation with a terminal crimping machine 400. More specifically, the receiver 200 is shown mounted to a base 412 of the machine 400. The cable holding device 100 is shown in an installed position within the receiver 200, with the radial-alignment key or pin 250 engaged therewith. The device 100 and the receiver 200 work in conjunction to accurately position the working end 12 of the cable 10 within a working space 410 of the crimping machine 400. With the holding device 100 installed within the receiver 200, the RFID interlock switch 240 may be activated by the associated RFID tag, and in-turn, the machine 400 turned on or otherwise made operative for use.

Figure 8:
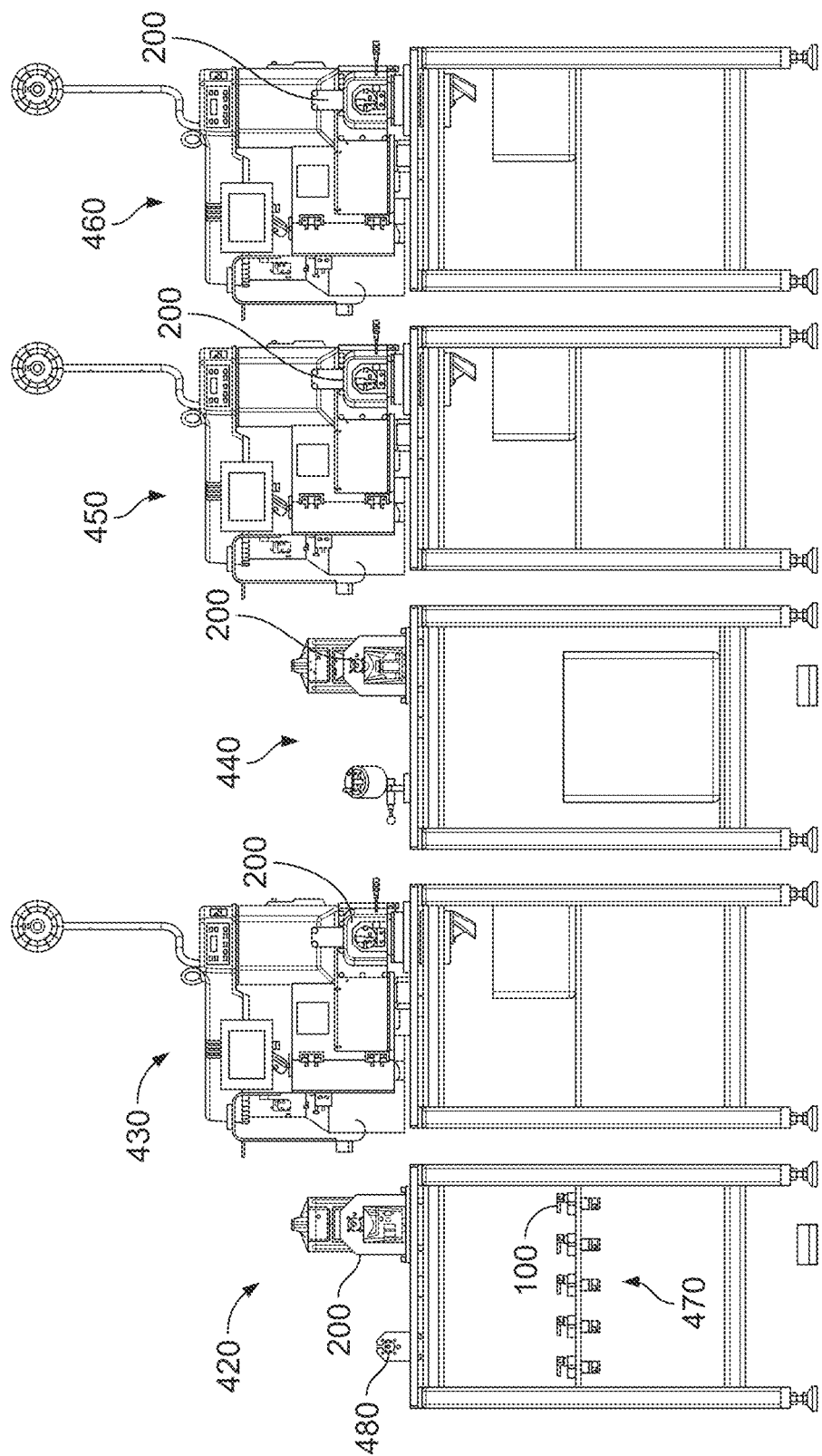
FIG. 8 is a schematic view of a plurality of cable processing machines or stations, each fitted with a receiver according to embodiments of the present disclosure.

While an exemplary terminal crimping machine 400 is shown in FIG. 7, according to embodiments of the present disclosure, a system includes multiple receivers 200 arranged at various respective machines used in a multi-step cable preparation process. For example, FIG. 8 illustrates a plurality of cable processing stations each fitted with a receiver 200. As shown, an exemplary cable processing line may include an initial cable loading and jacket stripping station 420. The station 420 may further include a rack 470 for holding a plurality of clamping devices 100 (e.g., clamping devices 100 of differing sizes for various cable diameters and/or cable types). A holding device or fixture 480 may also be provided for temporarily holding a device 100 as a cable is loaded therein, as described above with respect to FIGS. 1-4. Once a cable is loaded and its jacket fully or partially stripped at the station 420, an operator removes the device 100 from the receiver 200 and proceeds to, for example, a ferrule crimping station 430, wherein the device 100 is inserted into its corresponding receiver 200, the machine enabled by the RFID switch, and a ferrule applied to an outer shielding layer of the cable. Subsequent cable processing stations include a braid folding/foil and dielectric layer stripping station 440, a center contact crimping station 450, and a subassembly crimping station 460. Each station includes a receiver 200, ensuring both the accurate placement of the working end of the cable relative to the respective machine, as well as providing the above-described RFID protection prior to the activation of the equipment at each station. It should be understood that the placement of each receiver 200, and/or the position of the key or locating pin thereof, may be varied at each station according to the necessary position of the working end 12 of the cable 10. The processing operations briefly described above are merely exemplary, and the cable holding device 100 and receiver(s) 200 may be used in any number of operational steps beyond those mentioned herein.

Figure 9:
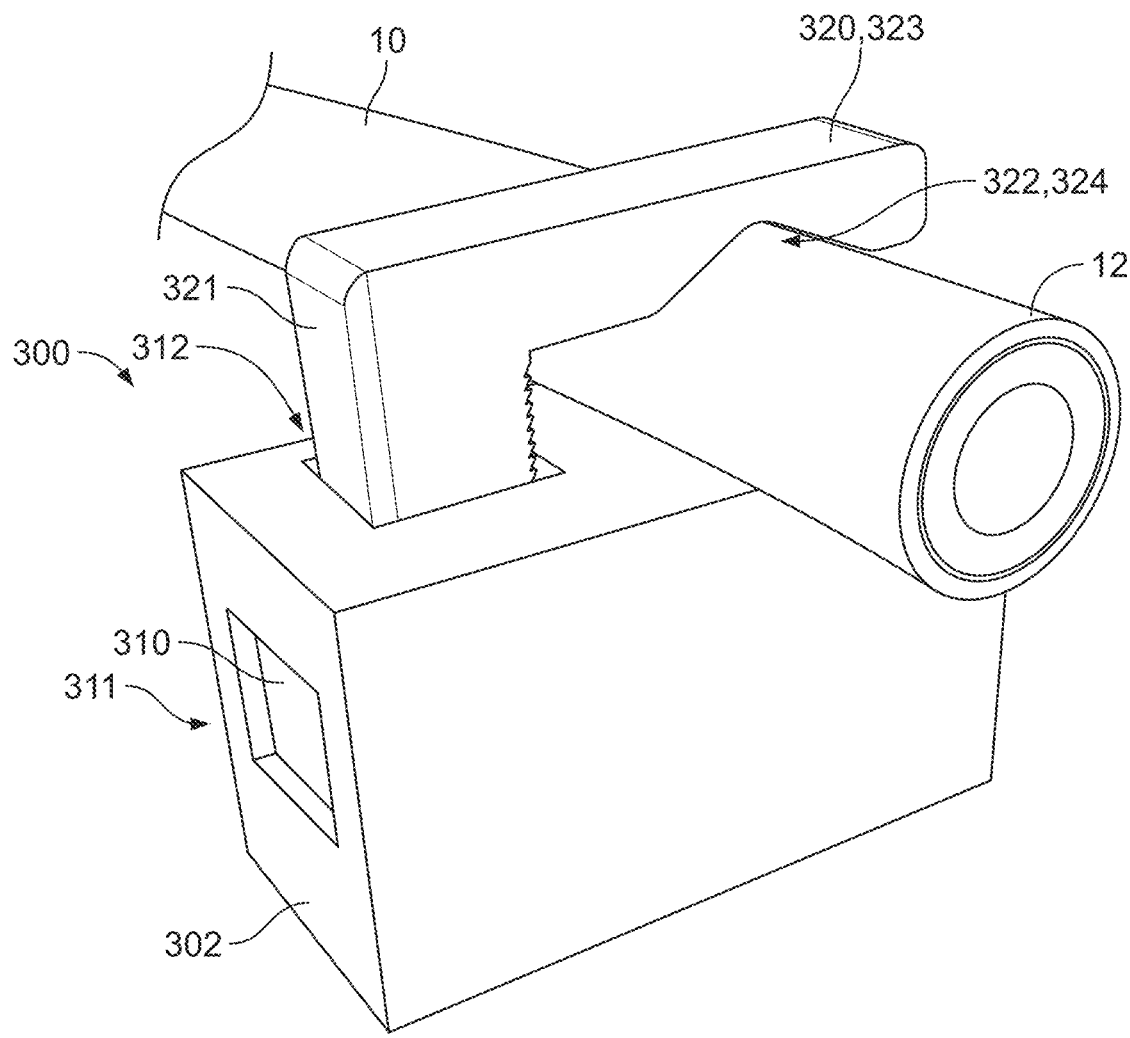
FIG. 9 is a front perspective view of a cable holding device according to another embodiment of the present disclosure.
Figure 10:
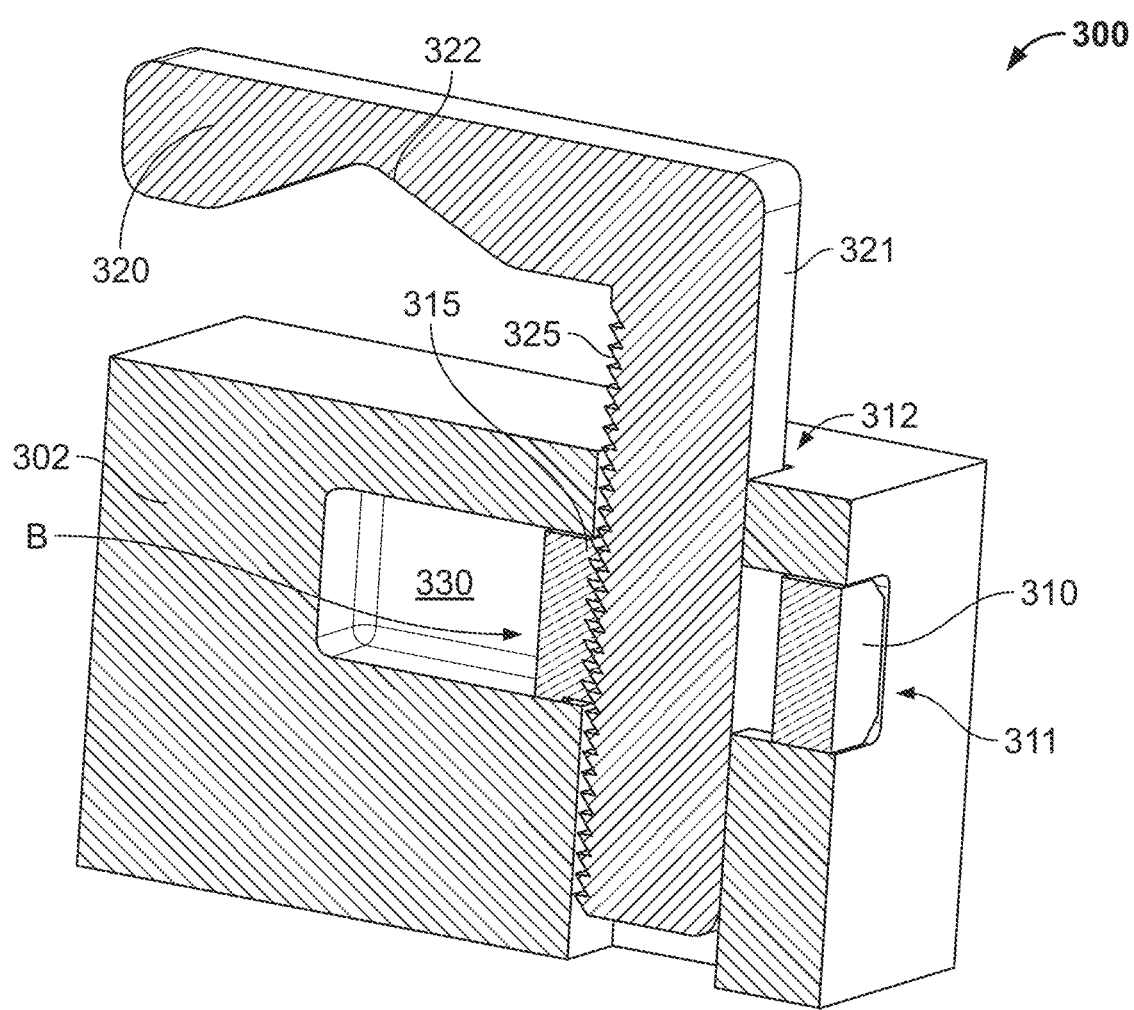
FIG. 10 is a perspective cross-sectional view of the cable holding device of FIG. 9.

A cable clamping device 300 according to another embodiment of the present disclosure is shown in FIGS. 9 and 10. The device 300 includes a body 302 having a moveable clamping element 320 attached thereto. The clamping element 320 is generally L-shaped and includes a first arm 321 received within an aperture 312 formed vertically through the body 302. A second or clamping arm 323 extends generally perpendicularly from the first arm 321 for engaging with and holding the cable 10, enabling the quick fixation of its working end 12. The second arm 323 may define an arcuate or triangular-shaped recess 322 formed in an underside thereof for accommodating the cable 10 in the clamped position shown in FIG. 9. The recess 322 aids in positioning the cable 10 relative to the arm 323 during clamping. The body 302 may define a similar recess formed opposite the recess 322 for defining a cable receiving opening between the body and the arm 323. An underside surface of at least the recess 322 defines serrations 324 for engaging with the cable 10, securing it in place and preventing slippage or other undesired movement. The body 302 may further define locating features in the form of mounting through holes for fixing the device 300 to, for example, a cable processing machine or loading station as described above.

In the exemplary embodiment, the clamping action or vertical position of the clamping element 320 is controlled via push-button actuation. Specifically, the body 302 comprises an aperture 311 in which an actuator or button 310 is slidably arranged. Referring generally to FIG. 10, the actuator 310 may be generally U-shaped or slotted, with the first arm 321 of the clamping element 320 extending through a central space defined thereby in the vertical direction. One side of the actuator 310 defines a pressing surface exposed from a side of the housing 302. A second side of the actuator 310 defines a toothing 315 opposing a complementary toothing 325 formed on an inside of the first arm 321. An elastic element, such as a spring, is arranged within the cavity space 330 defined by the aperture 311. The elastic element acts to bias the actuator 310 in the indicated direction B, and into a locked position with the first arm 321 by engaging the complementary teeth 315,325. In the locked position, the vertical position of the clamping element 320 is fixed relative to the body 302. The clamping element 320 is released by pressing or applying a force on the actuator 310 in a direction opposite the direction B (or spring force), biasing the actuator 310 into the cavity space 330, and the teeth 315,325 out of engagement.

The teeth 315,325 are formed with a rake angle which provides for one-way movement of the clamping element 320 with the actuator 310 biased into the locked position shown in FIG. 10. Specifically, the teeth 315,325 are raked (e.g., oppositely, with each having a rake angle of zero) such that they will slip or skip relative to one another as the clamping element 320 is moved (i.e., pressed) vertically downward by a user. In the opposite direction, however, the teeth 315,325 define opposing surfaces oriented such that no relative slipping will occur (e.g., opposing surfaces oriented near perpendicular to the vertical direction). In this way, a ratcheting or one-way motion of the clamping element 320 is achieved. According to the above, in use, a user may depress the actuator 310 and raise the clamping element 320. The actuator 310 may then be released, and the cable 10 inserted between the body 302 and the second or clamping arm 323. With the cable 10 positioned, a user presses downwardly on the clamping element 320 until a desired pressure on the cable is achieved. The clamping element 320 is then be released, and its position (and thus the clamping force on the cable 10) maintained via the engaged teeth 315,325. Once an operation has been performed on the cable 10, the actuator 310 may be depressed again to release the clamping element 320.

Figure 11:
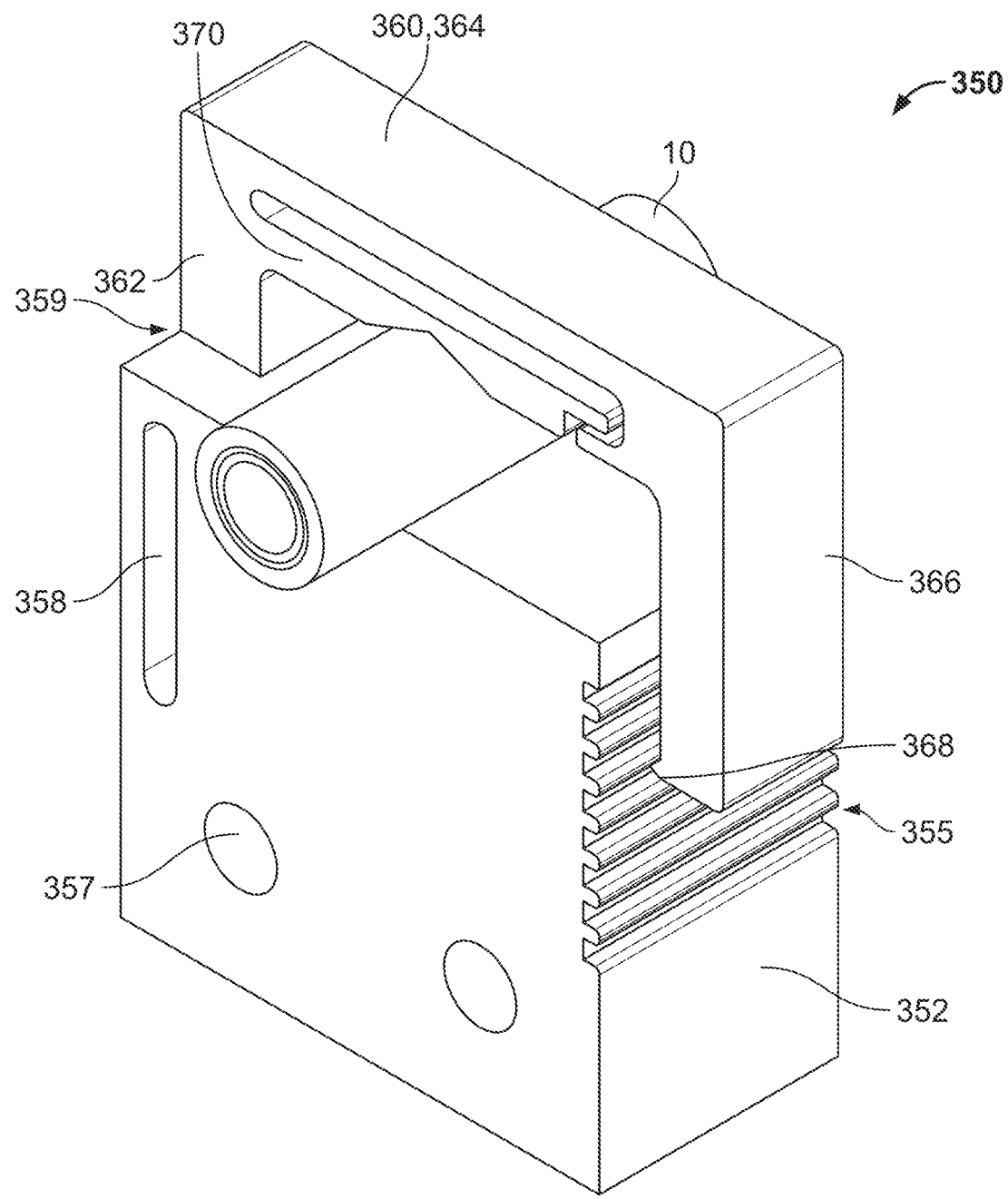
FIG. 11 is a front perspective view of a cable holding device according to another embodiment of the present disclosure.
Figure 12:
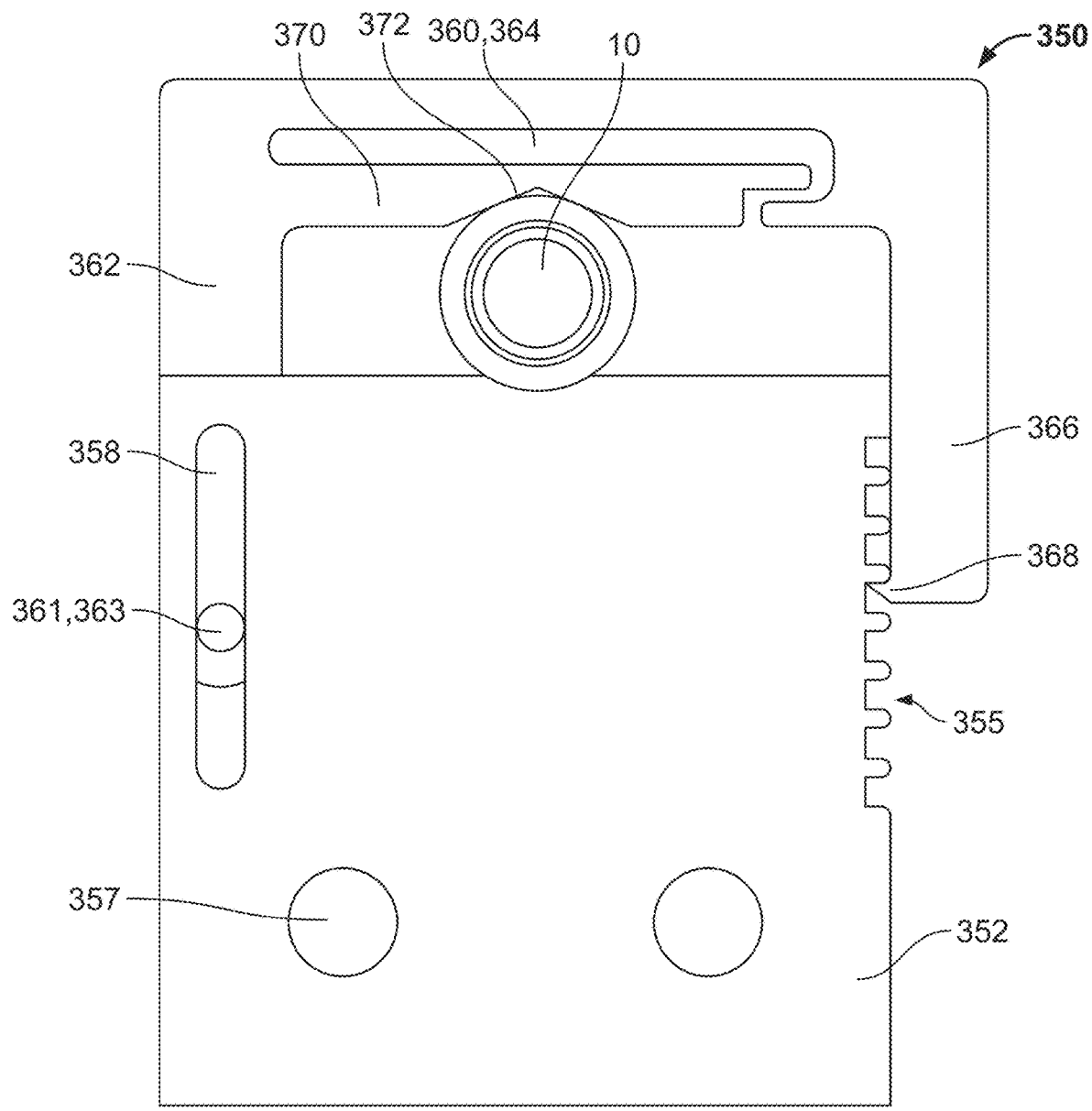
FIG. 12 is a front view of the cable holding device of FIG. 11.

Referring now to FIGS. 11 and 12, a cable clamping device 350 according to another embodiment of the present disclosure is illustrated. The device 350 includes a body 352 defining a toothing 355 on a lateral exterior side thereof. An opposite lateral side of the body 352 defines a slot-like opening 359 into which a first arm 362 of a generally U-shaped clamping element 360 is slidably received. The body 352 defines a slot 358 extending through its thickness and in a vertical direction. As shown in FIG. 12, the first arm 362 defines an aperture 361 aligned within the slot 358 and receiving a pin 363 or other fastener therethrough. In this way, the clamping element 360 is both rotatably and slidably attached to the body 352 on an end of the first arm 362. The body 352 further defines locating features in the form of mounting through holes 357 for fixing the device 350 to, for example, a processing machine or loading station as described above.

A second arm 366 of the clamping element 360 is formed opposite the first arm 362 and extends generally parallel therewith. The second arm 366 defines a pawl 368 on an end thereof for engaging with the toothing 355 of the body 352. A third arm 364 of the clamping element 360 connects the first arm 362 and the second arm 366, and is arranged generally perpendicular thereto for defining the U-shaped profile. A further cantilevered clamp arm 370 is arranged below the third arm 364 and extends from the first arm 362 in a direction generally toward the second arm 366 and parallel to the third arm 364. The clamp arm 370 includes a centering recess 372 formed along a length thereof for centering the cable 10 relative to the arm during clamping. By cantilevering the arm 370, it remains compliant or elastically deformable during a cable clamping process. This prevents damage to the cable 10 by precluding the placement of excessive compressive force thereon.

As can be visualized from the figures, as the cable 10 is secured between a top of the body 352 and the clamp arm 370, the pawl 368 engages the teeth 355 in a one-way ratcheting fashion. As the cable 10 is compressed, the pin or fastener 363 will be urged laterally within the slot 358, binding it therein such that a compressive force of the cable 10 is maintained. The cable 10 may be released from the clamped position by the application of additional downward pressure on the clamping element 360, freeing the pin 363 from its bound state and permitting the disengagement of the pawl 368 from the teeth 355 by rotating and/or lifting the clamping element 360. During this release operation, the compliance added by the cantilevered arm 370 prevents damage to the cable 10.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A cable holding system for positioning a cable relative to a plurality of cable processing machines, comprising:
   a cable holding device for selectively clamping onto a cable to be processed; and
   a plurality of receivers each associated with a respective one of the plurality of cable processing machines, each receiver including:
      an opening for selectively receiving the cable holding device in a predetermined orientation; and
      a mounting base for fixing the location of the receiver relative to the cable processing machine.

2. The cable holding system of claim 1, wherein the cable holding device includes a radio-frequency identification (RFID) tag, and each receiver includes an RFID interlock switch for operatively connecting to the at least one cable processing machine.

3. The cable holding system of claim 1, wherein at least one of the cable holding device or each receiver includes a locating feature for fixing a radial position of the cable holding device relative to the receiver.

4. The cable holding system of claim 1, wherein at least one of each receiver or the cable holding device includes a magnet for retaining the cable holding device within the opening of the receiver in an axial direction.

5. The cable holding system of claim 1, wherein the cable holding device includes:
   a base having a diameter greater than that of each receiver opening for limiting an insertion depth of the cable holding device within the receiver in an axial direction;
   an intermediate section extending from the base and having a diameter corresponding to that of each receiver opening, the intermediate section arranged within the opening in an installed position of the cable holding device; and
   an end section extending from the intermediate section and having a diameter less than that of the intermediate section, the end section being inserted through the opening as the cable holding device is moved into the installed position.

6. A cable holding device for securing a cable relative to a cable processing machine, comprising:
   a body, including a base, an intermediate section extending from the base, and an end section extending from the intermediate section, the base having a cross-sectional dimension greater than a cross-sectional dimension of the intermediate section, and the end section has a cross-sectional dimension less than a cross-sectional dimension of the intermediate section;
   a clamp movably mounted to the body;
   an opening defined between the body and the clamp for receiving the cable, the opening defining a slot extending through the base, the intermediate section and the end section; and
   the clamp selectively securing the cable within the opening in a clamped position; and
   a locating feature defined by the body for fixing a position of the cable relative to the cable processing machine with the cable secured within the opening.

7. The cable holding device of claim 6, wherein the locating feature includes one of a keyway or locating pin oriented in an axial direction of the opening for fixing the radial position of the cable.

8. The cable holding device of claim 6, further comprising a radio-frequency identification (RFID) tag fixed to the body.

9. The cable holding device of claim 6, wherein the clamp is rotatably attached to the end section.

10. The cable holding device of claim 6, wherein the base, the intermediate section and the end section are cylindrical or semi-cylindrical in shape.

11. The cable holding device of claim 10, wherein the end section is semi-cylindrical in shape, and the clamp defines a semi-cylindrical clamping end rotatable attached to the end section about an axis oriented parallel to an axial direction of the opening.

12. The cable holding device of claim 6, wherein the opening defines serrations formed in the end section for engaging with an outer surface of the cable.

13. The cable holding device of claim 12, wherein the clamp includes an elastic material oriented opposite the serrations with the clamp in the clamped position.

14. The cable holding device of claim 6, further comprising a clamp lock for selectively fixing the clamp in the clamped position, the clamp lock including a sliding pin extending through the base and intermediate section of the body in the axial direction of the opening, the sliding pin being actuated from a side of the base opposite the end section.

15. A receiver for positioning a cable holding device relative to a cable processing machine, comprising:
a base;
a receiving body moveably mounted to the base in at least the vertical direction and defining an aperture for receiving and capturing a cable holding device in a predetermined orientation, the cable holding device fixedly attached to a cable to be processed by the cable processing machine, the receiving body moveable relative to the base such that the entire aperture is moveable relative to the base for moving the cable holding device received within the aperture relative to the base in the vertical direction; and
a locating feature for positioning the cable holding device relative to the receiving body.

16. The receiver according to claim 15, further comprising a magnet arranged on a first side of the receiving body for retaining the cable holding device within the aperture.

17. The receiver according to claim 15, further comprising a radio-frequency identification (RFID) interlock switch fixed to the receiving body for interrogating an RFID tag of the cable holding device.

18. The receiver according to claim 15, wherein the receiving body is resiliently moveably mounted to the base via at least one elastic element.

19. A cable holding system for securing a cable relative to a cable processing machine, comprising:
a cable holding device, including:
a body having a base, an intermediate section extending from the base, and an end section extending from the intermediate section, the base having a cross-sectional dimension greater than a cross-sectional dimension of the intermediate section, and the end section has a cross-sectional dimension less than a cross-sectional dimension of the intermediate section;
a clamp movably mounted to the body; and
an opening defined between the body and the clamp for receiving the cable, the clamp selectively securing the cable within the opening in a clamped position.

20. The cable holding system of claim 19, further comprising a receiver including:
an opening for selectively receiving the cable holding device in a predetermined orientation; and
a mounting base for fixing the location of the receiver relative to the cable processing machine,
wherein the cable holding device further includes a locating feature defined by the body for fixing a position of the cable relative to the cable processing machine with the cable secured within the opening.

* * * * *